United States Patent [19]
Erickson, Jr. et al.

[11] Patent Number: 5,532,931
[45] Date of Patent: Jul. 2, 1996

[54] LOW TOLERANCE POSITIONING SYSTEM IN AN AUTOMATED HANDLING SYSTEM

[75] Inventors: Jack N. Erickson, Jr.; Jack M. Gazza; Victor S. Olivas; Charles A. Thompson, all of Tucson, Ariz.

[73] Assignee: International Business Machines Corporation, Armonk, N.Y.

[21] Appl. No.: 282,868

[22] Filed: Jul. 29, 1994

[51] Int. Cl.$^6$ ............... G06F 17/00; G11B 15/68
[52] U.S. Cl. ............... 364/478.06; 360/92.000; 369/34.000; 414/277.000
[58] Field of Search ............... 364/478, 479; 369/34, 36, 37–39; 360/88, 91, 92, 98.04–98.06, 71; 414/273, 277

[56] References Cited

U.S. PATENT DOCUMENTS

| | | | |
|---|---|---|---|
| 3,872,445 | 3/1975 | Pease . | |
| 4,412,293 | 10/1983 | Kelley et al. | 364/478 |
| 4,527,262 | 7/1985 | Manto | 369/34 |
| 4,685,095 | 8/1987 | Rudy et al. | 369/36 |
| 4,731,682 | 3/1988 | Nishiyama et al. | 360/92 |
| 4,839,505 | 6/1989 | Bradt et al. | 364/479 |
| 4,860,133 | 8/1989 | Baranski . | |
| 5,068,958 | 12/1991 | Kosmowski . | |
| 5,282,183 | 1/1994 | Arifuku et al. | 369/36 |

OTHER PUBLICATIONS

IBM Technical Disclosure Bulletin vol. 27, No. 2, Jul. 1984, pp. 1033–1034.
IBM Technical Disclosure Bulletin vol. 20, No. 12, May. 1978, pp. 5281–5286.
IBM Technical Disclosure Bulletin, vol. 29, No. 4, Sep. 1986, pp. 1986–1987.
IBM Technical Disclosure Bulletin, vol. 36, No. 06B, Jun. 1993, pp. 545–547.

*Primary Examiner*—Roy N. Envall, Jr.
*Assistant Examiner*—Steven R. Garland
*Attorney, Agent, or Firm*—F. E. Anderson

[57] ABSTRACT

An automated storage system transports data cartridges between a storage device and a plurality of storage cells via a picker assembly. The storage cells are formed of one or more removable magazines. The picker assembly accurately locates each data cartridge within a storage cell by first establishing a zero position reference and locating a home position relatively therefrom. The home position is a predetermined point on each magazine. An infrared detector and infrared sensor are situated on the picker assembly for precisely locating the home position. Each cartridge is known to be located within a predetermined tachometer count range from the home position. The detector/sensor is used to precisely locate each cartridge. The precise tachometer position is stored and the cartridge is returned to the known location. As a result, tolerance accumulation effects are eliminated in the system.

16 Claims, 6 Drawing Sheets

LOW TOLERANCE POSITIONING SYSTEM IN AN AUTOMATED HANDLING SYSTEM

FIELD OF THE INVENTION

The present invention relates generally to robotic handling systems, and more particularly, to a storage system having a picker assembly with a positioning system for accurately locating objects located within storage cells.

BACKGROUND OF THE INVENTION

Many business and science applications use computers to record data, with much of the data being stored on removable media. The removable media may take the form of magnetic tape cartridges, optical disk cartridges, floppy diskettes, or floptical diskettes. The advantages of storing data on removable media are numerous. These advantages include a capability of storing large amounts of data (additional cartridges can be used to store additional data), providing a vehicle for long term storage and archival, backing up data which resides on non-removable media, and allowing for easy transfer of data between computers. Removable media typically provides the most economical means of retaining the stored data.

In the past, when a request for a specific removable medium (hereinafter referred to as data cartridge) was made, an operator needed to retrieve the data cartridge and physically load the selected data cartridge into the storage device. This manual mode involved a significant delay while the data cartridge was being retrieved by the operator before the data on that data cartridge could be processed. Additionally, the operator could easily make an error and load an incorrect data cartridge.

With advancements in data storage products, the data cartridges were reduced in size and robots were designed and incorporated to automatically retrieve data cartridges and load those data cartridges into a storage device. The robot is housed within an automated storage library that also contain one or more storage devices and a plurality of data cartridges placed within storage cells. The robot replaced the operator resulting in improved access time and reliability. However, an initial alignment with each of the data cartridges within the storage cells would have to be established to allow for the robot to retrieve a chosen data cartridge. Often a camera is mounted to the robot to provide the feedback for the robot to be aligned with the desired data cartridge. Furthermore, the storage cells would be fixed and accurately located within the automated storage library to improve the reliability of the robot. Removal or shifting of the storage cells (as is possible with magazine type storage cells) requires realigning the robot.

The difficulties and expense that exist with the camera positioning system have been addressed, to some degree, by using a strip encoder to provide positioning feedback. The strip encoder is affixed or aligned to the storage cells and is detected by sensors placed on the picker assembly. Both the strip encoder and the storage cells require identical cell-to-cell spacing (pitch) to accurately locate the picker assembly with each corresponding storage cell. Moreover, the strip encoder needs to be precisely affixed or aligned to the storage cells.

Thus, what is need is a positioning system having a capability to directly detect data cartridges residing in the storage cells. Consequently, the complexity and expense of a camera feedback system is desired to be eliminated; likewise, the location tolerances between a strip encoder and the storage cells could also be eliminated. A positioning system which directly detects the data cartridges should precisely align the picker assembly with the storage cells without requiring the storage cells to be accurately located. Thus the storage cells could easily be removed and replaced within the automated storage library without hindering the alignment method. Furthermore, the data cartridges would not need to be accurately located within the storage cells, which would require less precision when manufacturing the storage cells.

SUMMARY OF THE INVENTION

An object of the present invention is to provide an improved positioning system for locating objects within a plurality of storage cell locations.

Another object of the present invention is to provide an automated storage system having a picker mechanism for randomly accessing storage media while minimizing time to access such storage media and minimizing the alignments required within the automated storage system.

According to a first embodiment of the present invention, an automated storage system for transporting a storage medium from a storage cell to a storage device and vice versa, includes a picker assembly mounted to an accessor which translates the picker assembly between the storage medium and the storage device. Mounted to the picker assembly are an infrared emitter and an infrared detector used for detecting a predetermined feature on the storage cells and the edges of said storage medium. Assembled within the accessor are a motor for driving the accessor and a tachometer used to provide counts during positioning. A driver card contains the motor drivers, a position compare register, and a position counter.

In another embodiment of the present invention, a method for positioning the picker assembly to be aligned with one of the plurality of storage medium is utilized. The method includes the steps of (a) moving the picker assembly to a first position at the end of the accessor travel; (b) translating the picker assembly a predetermined distance to a second position near the extended tab located on the storage magazine; (c) detecting the extended tab of the storage magazine to establish a "home" reference for said magazine; (d) saving the tachometer count of the magazine's "home" reference in a position register; (e) moving the picker assembly a predetermined distance to third position approximately in line with one of the storage medium; (f) detecting the edge of the storage medium; and (g) saving the tachometer count of the storage medium's edge within a position register.

The foregoing and other objects, features, and advantages of the invention will be apparent from the following more particular description of a preferred embodiment of the invention, as illustrated in the accompanying drawing.

DETAILED DESCRIPTION OF THE INVENTION

Figure 1:
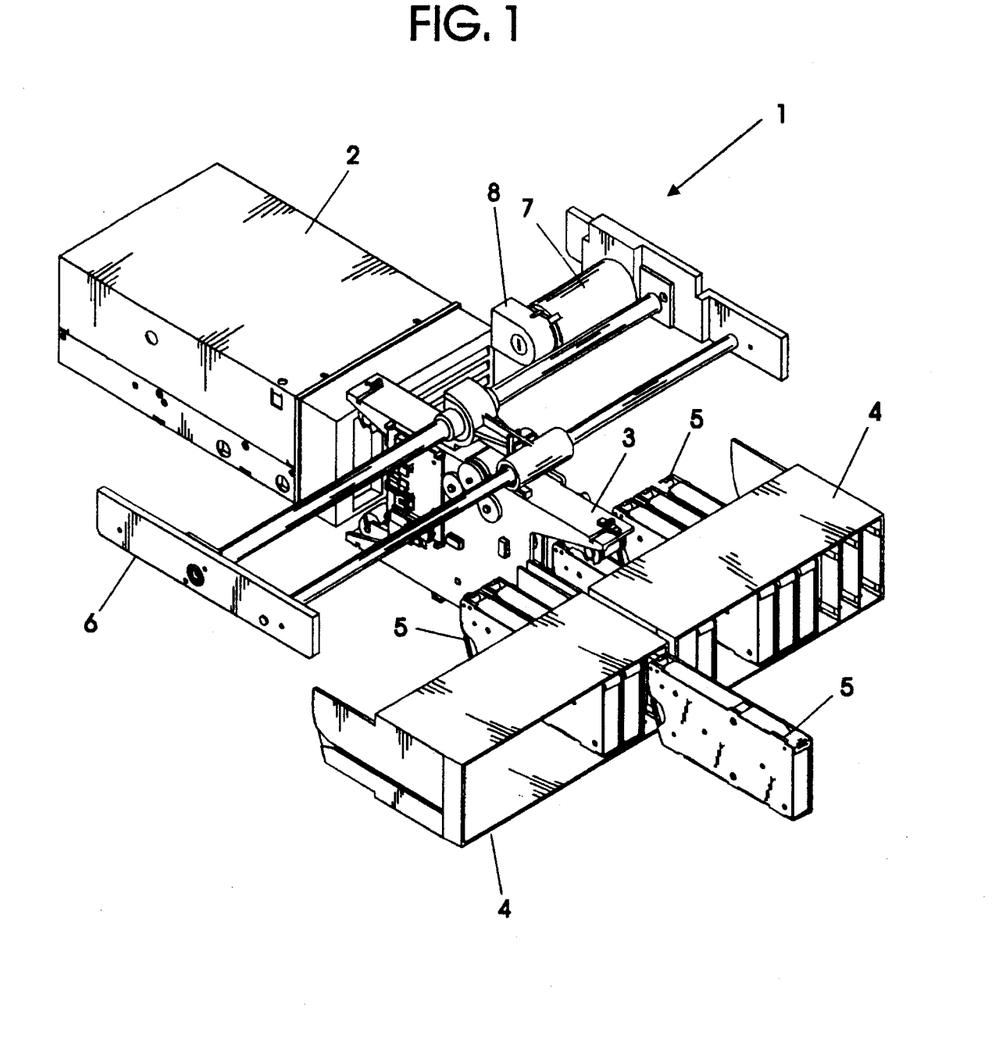
FIG. 1 is a pictorial diagram of an automated storage system having magazines containing removable media, a storage device, a picker assembly, and an accessor assembly.

Referring now to the drawing, like numerals correspond to like parts depicted in the figures. The invention will be described as embodied in an automated magnetic tape storage system for use in a data processing environment. Although the invention is shown using magnetic tape cartridges, one skilled in the art will recognize that the invention equally applies to optical disk cartridges or other storage media. Furthermore, the description of an automated magnetic tape storage system is not meant to limit the invention to data storage applications as the invention described herein can be applied to robotic handling systems in general. FIG. 1 shows an automated storage system 1 for managing removable media, for example magnetic tape cartridges. The removable media is contained within a plurality of data cartridges 5. Each data cartridge 5 is located within a magazine 4, wherein each magazine 4 includes a plurality of storage cells for holding the plurality of data cartridges 5. The magazine 4 provides a means of retaining each data cartridge 5 while also allowing access to retrieve the plurality of data cartridges 5 via a picker assembly 3.

The automated storage system 1 also includes at least one storage device 2, for example an IBM 3494 Magnetic Tape Drive. The magazine 4 is located across from and parallel to the storage device 2. A magazine may also reside parallel and adjacent to the storage device 2 (not shown). The picker assembly 3 transports a data cartridge 5 from the magazine 4 to a storage slot in the storage device 2. The picker assembly 3 is attached to an accessor 6 that translates the picker assembly parallel to the storage device 2 and magazine 4. The accessor 6 contains a motor 7 and a tachometer 8. The translation allows the picker assembly 3 to be positioned directly in line with any of the plurality of data cartridges 5 and/or the storage slot.

Upon being positioned in line with a selected data cartridge 5, the picker assembly 3 retrieves the data cartridge 5 from the magazine 4. The data cartridge 5 is retained within the picker assembly 3 while the picker assembly 3 is translated to the storage device 2 via the accessor 6. At the storage device 2, the picker assembly 3 transfers the data cartridge 5 into the storage device 2. After the storage device 2 has processed the data cartridge 5, the picker assembly 3 removes the data cartridge 5 from the storage device 2 and is translated back to the originating storage cell (or an empty storage cell) within the magazine 4, where the picker assembly 3 transfers the data cartridge 5 back into the magazine 4.

Figure 2:
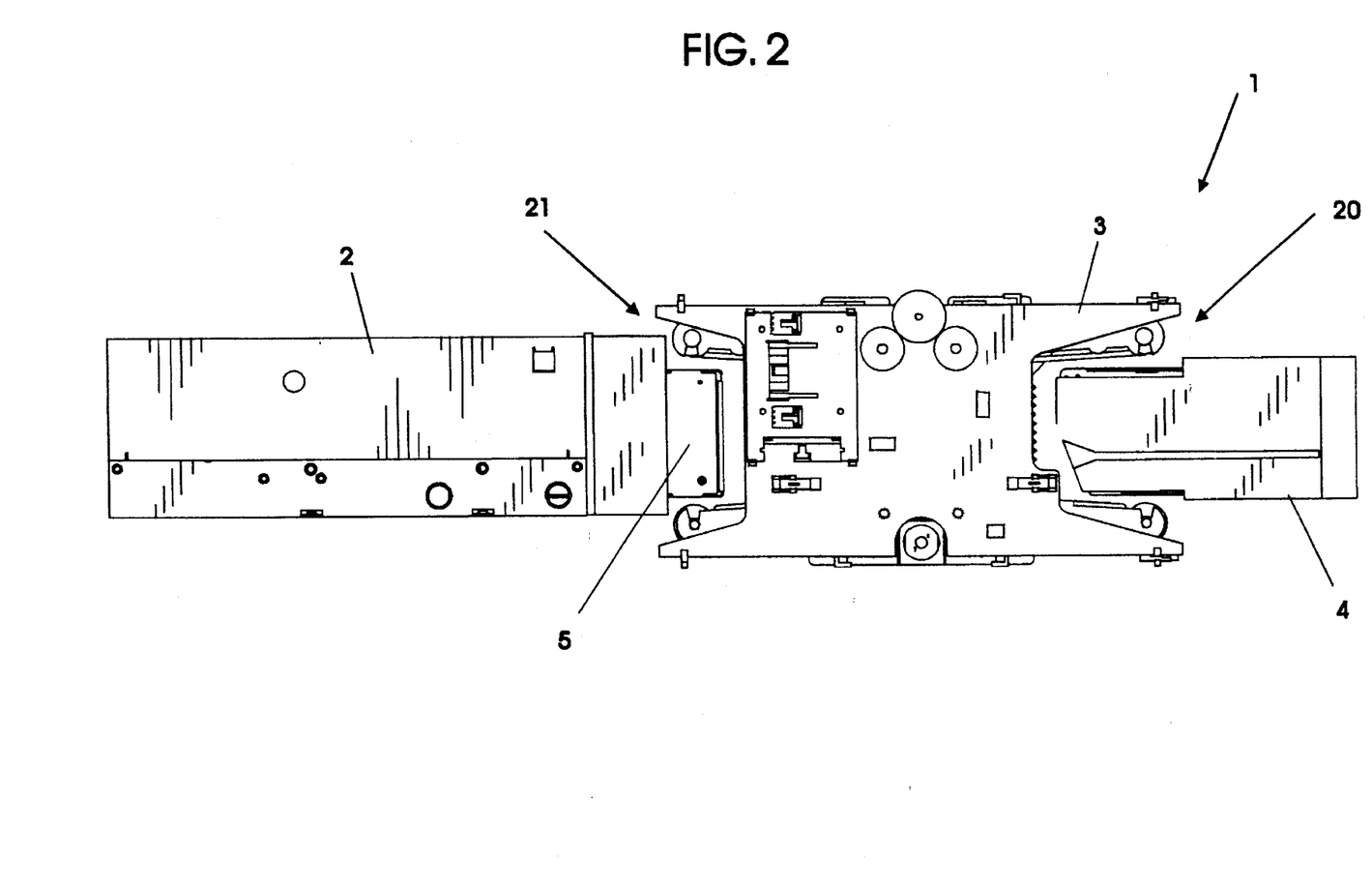
FIG. 2 is a side view of the automated storage device illustrating a picker assembly utilizing a fore and aft gripper.

Referring now to FIG. 2, a tandem relationship of fore and aft grippers 20 and 21, respectively, of the picker assembly 3 is shown. The fore gripper 20 faces the magazine 4, and the aft gripper 21 faces the storage device 2. The fore and aft grippers 20, 21 each include upper and lower fingers which close for gripping an article. The tandem relationship of the fore gripper 20 to the aft gripper 21 enables a data cartridge 5 to "pass-thru" the picker assembly 3, hence the picker assembly 3 operates as a pass-thru picker. Both the fore and aft grippers 20, 21 extend beyond an envelope of the data cartridges 5 when a data cartridge 5 is present on either side of the picker assembly 3. For the picker assembly 3 to be translated, the fore and aft grippers must be in an open position (as shown) to avoid an interference with any residing data cartridges 5. In order to retrieve a data cartridge 5 from the magazine 4 or the storage device 2, the appropriate fore or aft gripper 20, 21 must close and contact the given data cartridge. The pass-thru picker is advantageous for system time and space efficiency, but other gripper mechanisms are available and may be suitable. For example, in a storage system handling objects other than data cartridges, a larger or smaller gripping mechanism may be desired.

Figure 3:
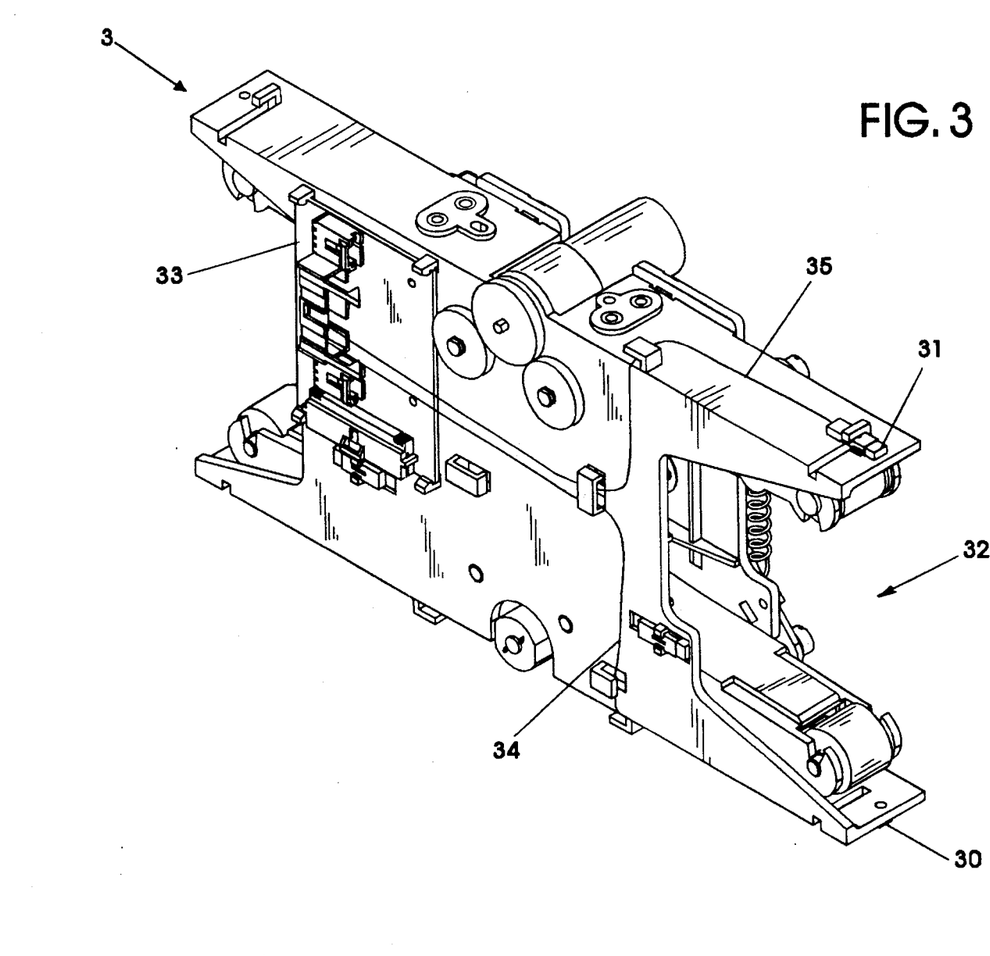
FIG. 3 is a perspective view of the picker assembly showing an infrared emitter and an infrared detector.

FIG. 3 shows the picker assembly 3 in greater detail, including the infrared emitter 30 and infrared detector 31 used to position the picker assembly. While the preferred embodiment of the present invention uses infrared light for detecting, one skilled in the art will recognize that other detector forms may be incorporated, including but not limited to optical, proximity or capacitive, and mechanical. Both of the infrared sensors are wired to an interconnect card 33 by cables 34 and 35, respectively. An infrared beam 32 couples the emitter 30 and the detector 31, and spans the area in which the cartridges are stored. Any object within this area, such as a cartridge or a magazine, will block the infrared beam 32 and interrupt the couple between the emitter 30 and the detector 31.

Figure 4:
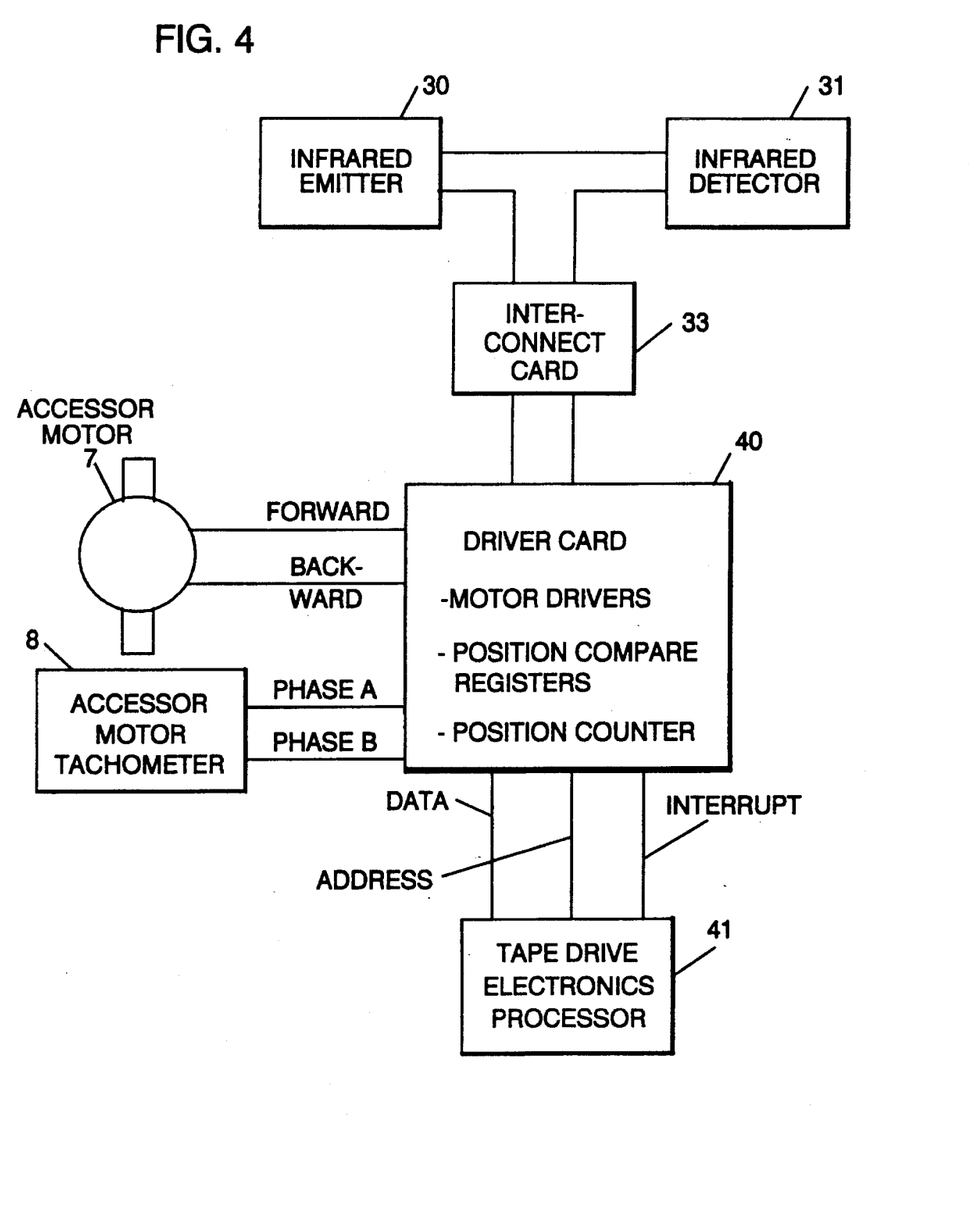
FIG. 4 is a block diagram depicting the primary components used within the positioning system.

FIG. 4 is a block diagram of the primary components of the system used to position the picker assembly. The infrared emitter 30 is coupled to the infrared detector 31 and senses if the spanned area is open or blocked. The infrared emitter 30 and the infrared detector 31 are cabled to an interconnect card 33 which resides on the picker assembly. The interconnect card 33 is cabled to a driver card 40 which contains motor drivers, position compare registers, and a position counter. Additionally, the driver card 40 is connected via forward and reverse direction lines to the accessor motor 7. Phase "A" and phase "B" lines provide feedback from the accessor motor tachometer 8 to the driver card 40. A processor resides within the tape drive electronics 41 and provides the motion control instructions used to position the picker assembly. The tape drive electronics 41 additionally contains the circuits and mechanics for writing data to and reading data from the data cartridges 5 as is well known in the art. The particular form of data storage may vary, e.g., linear, helical, analog, etc., and is not dispositive of the present invention.

Figure 5:
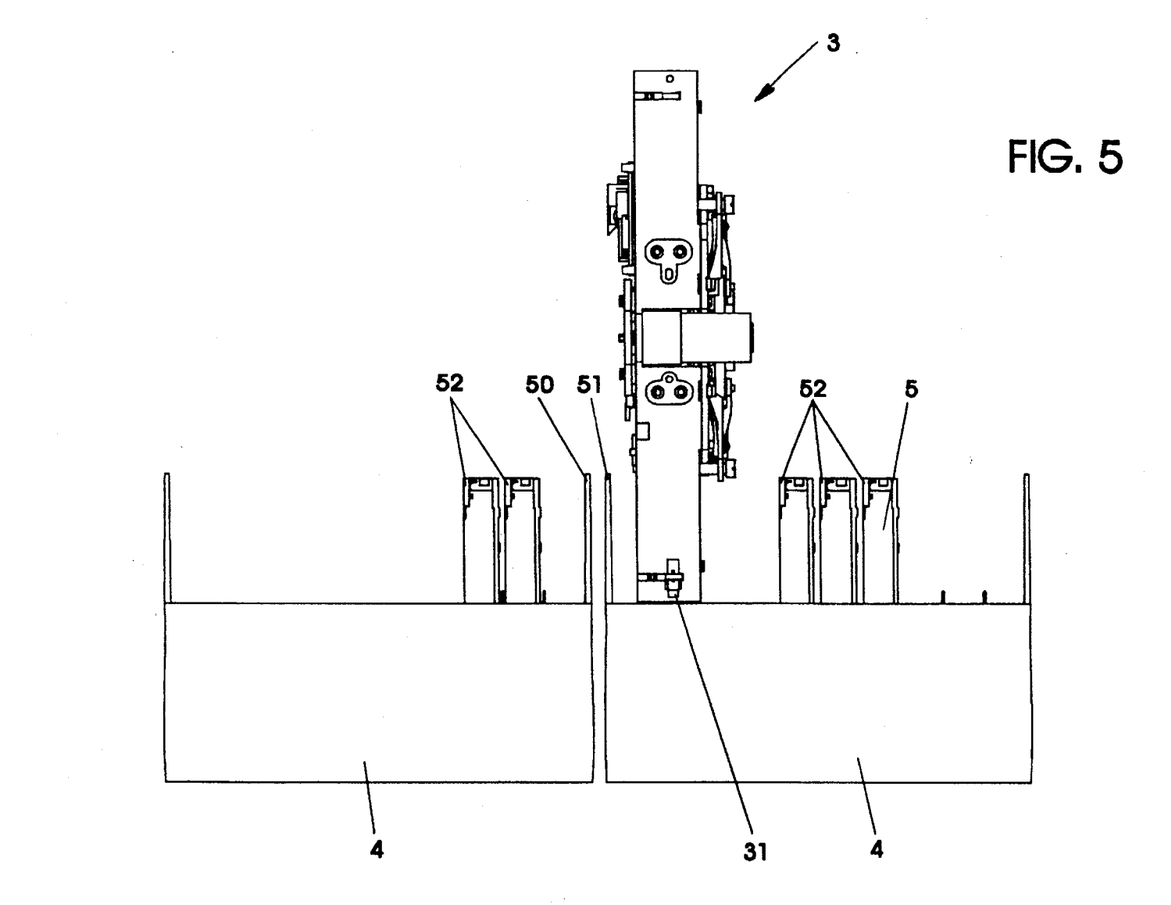
FIG. 5 is a plan view of the magazines with cartridges and the picker assembly illustrating the reference edges of the magazines and the cartridges.

FIG. 5 depicts the spatial relationship between the picker assembly 3 and the magazines 4. In this plan view, the infrared detector 31 can be seen; the infrared emitter is located directly beneath the detector 31 in a plane below the data cartridges 5. As the picker assembly 3 is translated, moving left to right, the infrared beam between the emitter and detector would be blocked by data cartridges 5 and the side tabs of the magazines 50 and 51.

Figure 6:
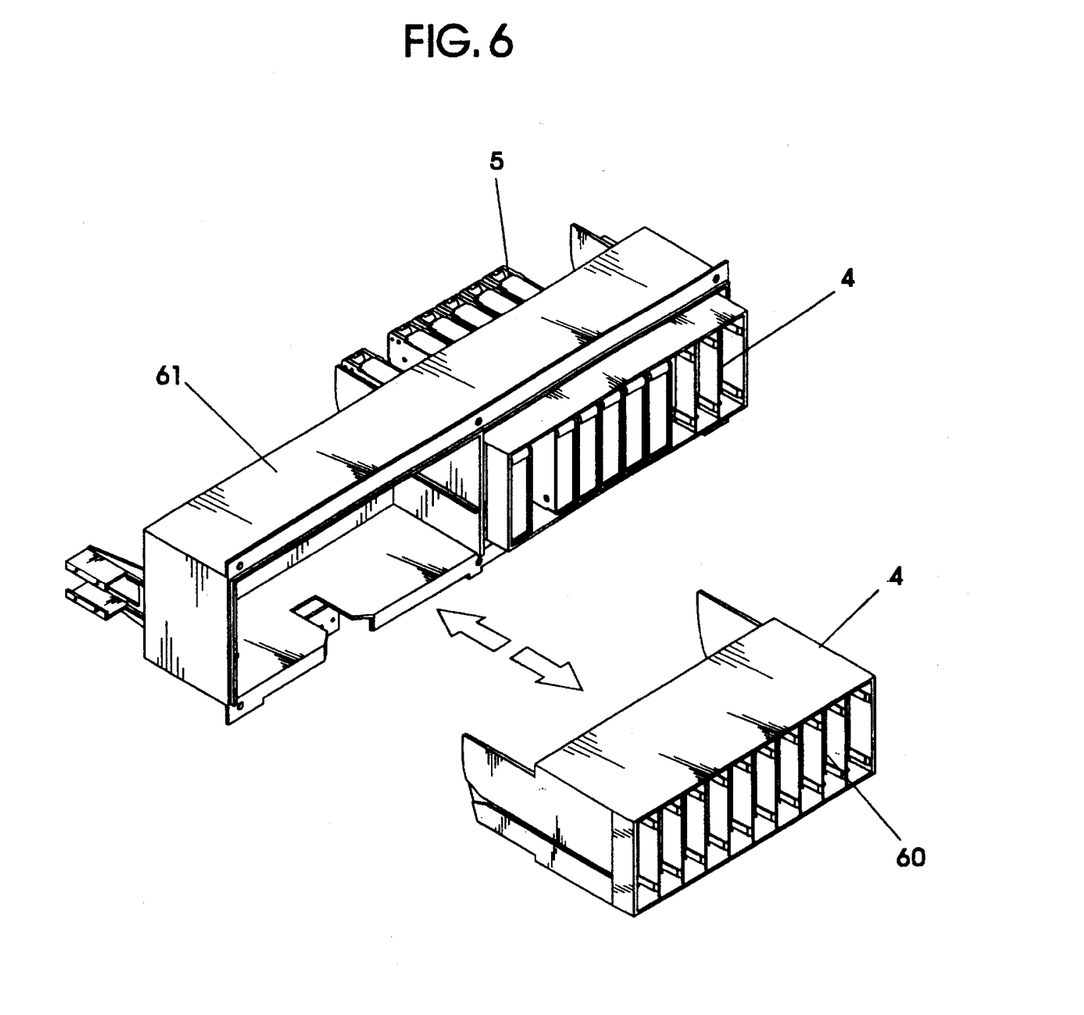
FIG. 6 is a pictorial diagram of the magazines and the retaining structure, illustrating the cartridge storage within the magazine and the removal of a magazine from the magazine's holder.

FIG. 6 shows the magazines 4 and the magazine's holder 61. Each magazine 4 contains a plurality of storage cells, defined by dividers 60 which separate the plurality of data cartridges 5. The magazine 4 is removable from the magazine's holder 61 as indicated by the arrows. The lateral location of the magazine 4 is determined by the fit between the magazine and the magazine holder 61. Likewise, the lateral location of each data cartridge 5 is set by the fit of the data cartridge 5 within the storage cell.

METHOD OF OPERATION

Referring again to FIG. 1 and FIG. 5, the automated storage system 1 will establish a zero position reference upon being powered on. Initially, the accessor 6 moves the picker assembly 3 to a left end of the accessor 6, thus establishing a zero position reference for the automated storage system 1. The zero reference position can alternately be established at a right end of the accessor 6 or at a limit switch position. From the storage system 1 zero position reference, the accessor 6 will translate the picker assembly 3 a predetermined distance to the right, to an approximate area where the extended tabs 50 and 51 of the left and right magazines 4 are expected. While the picker assembly 3 is being moved, the number of counts generated by the tachometer 8 is being monitored. As the picker assembly 3 traverses the area, the infrared beam is blocked first by the extended tab 50 of the left magazine 4 (if the magazine has been inserted), and next by the extended tab 51 of the right magazine 4 (also if that magazine has been inserted). The locations of the extended tabs 50 and 51 are noted and establishes a "home" reference for that specific magazine 4. Travel to any storage cell within a magazine 4 is made as a delta from the magazine's "home" reference.

Using the positioning method described herein eliminates any magazine location error that exists because of tolerances of the magazine 4, tolerances of the magazine holder 61, and clearance between the magazine 4 and the magazine holder 61. Therefore, the magazine 4 does not need to be held in a tight nominal position because the automated storage system is able to determine where the magazine 4 is located and establish a "home" reference for moving to storage cells within the magazine 4.

Again referencing FIG. 1 and FIG. 5, the positioning method used to establish the magazine's "home" reference is extended further to eliminate the cumulative effect of tolerances within the magazine 4. Because narrow gaps exists between the data cartridges 5, the infrared emitter 30 and infrared detector 31 are able to locate the edge of any cartridge 52 within the magazine 4. To detect the edge 52, the picker assembly is translated a predetermined distance from the magazine's "home" reference 50 or 51, to an approximate area where the gap to the left of the chosen cartridge 5 is expected. Referencing the tachometer count at the magazine's "home" reference, the delta to the counts generated by the tachometer 8 is monitored. As the picker assembly 3 traverses the cartridge's edge 52 the infrared beam is blocked, and the tachometer count is saved in a register. Noting the tachometer count at this time allows the data cartridge 5 to be removed, brought to the storage device 2, returned from the storage device 2 to the same tachometer count, and placed into the magazine 4 in essentially the same position. This positioning can be repeated for any of the plurality of data cartridges 5. Positioning may also be accomplished via an encoder or stepping motor. The only positioning tolerances that remain are in the lead accuracy of the device that translates the picker assembly 3. All of the storage cell tolerances have been eliminated from positioning the picker assembly 3. As a result, storage cells, and hence data cartridges 5, can be packed more tightly since picker assembly 3 positioning is more precise. Conversely, data cartridges may be packed more loosely (manufacturing tolerance relaxed) due to the improved precision. Packing data cartridges 5 more tightly or relaxing manufacturing tolerances is a design choice based in part upon cost and space considerations.

The positioning method described herein provides a means of transporting a data cartridge from a magazine to a storage device, and vice versa, while eliminating the tolerance accumulation that is present in the system. Mounted to the picker assembly are an infrared emitter and detector which span the data cartridges and magazines. The infrared beam between the emitter and detector is used to locate the extended tab on each magazine, and establish a "home" reference for each magazine. Consequently the magazine need not be held in a tight nominal position, and can easily be removed without hindering the alignment. The infrared beam is also used to detect the edge of the data cartridges residing in the magazine, thereby eliminating the cumulative effect of tolerances within the magazine. By doing so, the data cartridges do not need to be accurately located within the storage cells and the magazine may be more readily manufactured.

In summary, an automated storage system for randomly selecting one storage medium from a plurality of storage media and transporting the selected storage medium therefrom has been described. The automated storage system includes a storage device for receiving the selected storage medium for retrieving data therefrom and/or storing data thereto. A plurality of storage cells contain the storage medium therein, the plurality of storage cells located across from and substantially parallel to the storage device. The storage media are oriented in the plurality of storage cells for direct transport to the storage device. A picker mechanism is used to retrieve the storage medium from the storage cells and the storage device. An accessor is positioned for carrying the picker mechanism and moving the picker mechanism between one of the plurality of storage cells and said storage device. An infrared emitter and an infrared detector are implemented to detect the magazine and the storage medium, and provide the positioning references for accurately locating any one of the storage medium.

While the invention has been particularly shown and described with reference to preferred embodiments thereof, it will be understood by those skilled in the art that various changes in form and details may be made therein without departing from the spirit and scope of the invention. For example, various changes may be made to certain materials as long as the critical requirements are met, for example, weight, strength, etc. The detectors described herein are infrared detectors, but the detector types may vary so long as object and home position detection is effectively accomplished. Still further, means for attaching structures together may be changed without departing from the scope of the invention.

What is claimed is:

1. A method for locating objects stationed within a plurality of storage cells for transporting said objects to a predetermined location, said method comprising steps of:

(a) moving a gripper mechanism to a home position;

(b) sensing when said gripper mechanism has arrived at said home position and storing a location indication of said home position, said home position having a known relationship to said plurality of storage cells;

(c) translating said gripper mechanism to a predetermined storage cell of said plurality of storage cells for retrieving an object therefrom;

(d) detecting when said gripper mechanism is located in a position to retrieve said object within said predetermined storage cell and then storing a location indication of said object; and (e) retrieving said object from said predetermined storage cell and transporting said object to said predetermined location.

2. The method according to claim 1 further comprising a step (f) returning said object from said predetermined location to said predetermined storage cell at the location indicated by the stored location indication for said object.

3. The method according to claim 2 further comprising a step (g) moving said gripper mechanism to a zero position reference location, wherein said home position is a known approximate predetermined distance therefrom.

4. The method according to claim 3 wherein the known approximate predetermined distance between said zero position reference and said home position is measured by a tachometer count.

5. In a data storage system having storage media stored in a plurality of storage cells, a method for locating and transporting a storage medium of said storage media, between a storage cell of said plurality of storage cells, and a storage device, wherein said plurality of storage cells are formed from at least one removable storage magazine having a detectable reference feature, the storage system having an accessor for moving a picker assembly with a detector thereon, wherein picker assembly locations are identified by tachometer counts as stored in a position register, said method comprising steps of:

(a) moving said picker assembly to a reference position;

(b) translating the picker assembly a predetermined distance to a second position near the reference feature on said storage magazine;

(c) detecting said reference feature by positioning said gripper assembly at said reference feature, and establishing a home position thereat;

(d) saving a tachometer count of said home position in said position register;

(e) moving said picker assembly a predetermined distance to a third position approximately in line with said storage medium;

(f) detecting an edge of said storage medium indicating said storage medium is within a gripping position of said picker assembly;

(g) storing a tachometer count of an edge of said storage medium in said position register;

(h) picking said storage medium from said storage cell and transporting said storage medium to said storage device for performing data operations on said storage medium; and (i) returning said storage medium to said storage cell at said tachometer count corresponding to the edge of said storage medium.

6. The method according to claim 5 wherein said picker assembly detects an edge of said storage medium when the edge interrupts a detector beam of said picker assembly, the detector beam being generated by said detector.

7. The method according to claim 6 wherein step (b)–(d) are repeated each time the removable storage magazine is replaced in the storage system.

8. An automated data storage system for selecting a storage medium from storage media for processing data on said storage medium, said automated storage system comprising:

a storage device for receiving the storage medium and processing data on said storage medium, said storage device having a processor for providing control instructions;

a storage magazine having a plurality of storage cells for storing said storage media;

an accessor;

a picker assembly movably coupled to said accessor, said picker assembly translated parallel to said storage cells and having an opening for accessing a storage medium of said storage media stored therein and transporting said storage medium from a predetermined storage cell to said storage device, said picker assembly having a detector for generating a detector field at the opening for detecting when an edge of said storage medium interrupts said detector field; and a driver assembly receiving said control instructions and coupled to said picker assembly for controlling said picker assembly, said driver assembly comprising:

a position indicator coupled to said picker assembly for indicating locations of said picker assembly; and a position register for storing location indications of said picker assembly, wherein said picker assembly is moved near a predetermined home position according to home location as described by said position indicator, said picker assembly further moved for detecting a reference point on said storage magazine and establishing said home position, said storage medium being located by said picker assembly by first moving said picker assembly to said storage cell storing said storage medium according to a location indicated by said position indicator and said picker assembly further locating said storage medium when said edge of said storage medium interrupts said detector field.

9. The automated storage system according to claim 8 wherein said picker assembly detector further includes:

an infrared emitter for generating the detector field; and an infrared detector for detecting when the detector field is interrupted.

10. The automated storage system according to claim 9 wherein said storage device is a magnetic tape device capable of reading and writing data to said storage medium.

11. The automated storage system according to claim 10 wherein said storage media are magnetic tape cartridges.

12. The automated storage system according to claim 11 wherein the storage magazine may be removed and replaced by another storage magazine, wherein said picker assembly reestablishes said home position.

13. An automated storage system having a storage device for receiving a data cartridge from a plurality data cartridges, said storage device having a processor for providing control instructions, the plurality of data cartridges stored in a removable magazine having a plurality of storage cells and a detectable reference feature, said automated storage system comprising:

an accessor;

a picker assembly having first and second fingers for gripping said plurality of data cartridges, said picker assembly further comprising an emitter on said first finger and a detector across from said emitter and on said second finger for receiving a detector field generated by said emitter, and further wherein the detector field is interrupted by passing the data cartridge or the detectable reference feature between said first and second fingers; and a driver assembly receiving said control instructions and coupled to said picker assembly for controlling said picker assembly, said driver assembly comprising:

a tachometer for measuring distances traveled by said picker assembly; and a position register for storing a zero position reference of said picker assembly and storing a home position of said picker assembly at the detectable reference feature, said position register further storing locations of each data cartridge as each data cartridge is accessed by said picker assembly.

14. The automated storage system according to claim 13 wherein each storage cell located by moving said picker assembly is a known tachometer count from said home position.

15. The automated storage system according to claim 14 wherein each data cartridge is located by moving the picker assembly from said corresponding storage cell location until said data cartridge in located between said first and second fingers such that an edge of said data cartridge interrupts said detector field.

16. The automated storage system according to claim 15 wherein each data cartridge is returned from the storage device to a position in a storage cell as indicated by a corresponding position stored in said position indicator.

* * * * *